United States Patent [19]

Siddall

[11] 3,711,517
[45] Jan. 16, 1973

[54] QUATERNARY ALKYL ETHERS OF MECHYLENEDIS-XYPHENYL COMPOUNDS

[75] Inventor: John B. Siddall, Palo Alto, Calif.

[73] Assignee: Zoecon Corporation, Palo Alto, Calif.

[22] Filed: March 5, 1970

[21] Appl. No.: 16,936

Related U.S. Application Data

[63] Continuation-in-part of Ser. No. 854,578, Sept. 2, 1969, Pat. No. 3,649,590.

[52] U.S. Cl. ..............260/340.5, 260/470, 260/473, 260/591, 260/592, 260/609, 260/652, 424/282
[51] Int. Cl. .............................................C07d 13/08
[58] Field of Search...................................260/340.5

[56] References Cited

OTHER PUBLICATIONS

Moore, et al., "Journ. Science Food Agriculture," Vol. 9(10), 1958, pp. 666–672.
Beroza, "Agricultural and Food Chemistry," Vol. 4(1), 1956, pp. 49–53.
Gersdorff et al., "Agricultural and Food Chemistry," Vol. 4(10), 1956, pp. 858–862.

*Primary Examiner*—Alex Mazel
*Assistant Examiner*—James H. Turnipseed
*Attorney*—Donald W. Erickson

[57] ABSTRACT

Quaternary alkyl ethers and thioethers prepared by conversion of secondary alcohol to secondary halide and etherification of halide which are useful insect control agents, perfumery agents, intermediates and in hydrocarbon polymers.

8 Claims, No Drawings

QUATERNARY ALKYL ETHERS OF MECHYLENEDIS-XYPHENYL COMPOUNDS

This is a continuation-in-part of my application Ser. No. 854,778, filed Sept. 2, 1969, now U.S. Pat. 3,649,590.

This invention relates to novel quaternary alkyl ethers and thioethers and intermediates. More particularly, the present invention is directed to novel quaternary alkyl ethers and thioethers of the following formula A:

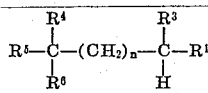

(A)

wherein, $n$ is an integer of one to six;

$R^1$ is the group -OR or -SR in which R is 3,4-methylenedioxyphenyl or the group

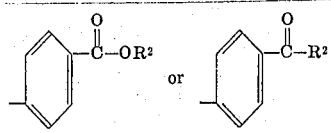

wherein $R^2$ is lower alkyl, cycloalkyl or aralkyl; and each of $R^3$, $R^4$, $R^5$ and $R^6$ is alkyl.

The term "alkyl," as used herein, refers to a straight or branched chain saturated aliphatic hydrocarbon group having a chain length of one to 12 carbon atoms, such as methyl, ethyl, n-propyl, i-propyl, n-butyl, t-butyl, n-hexyl, n-amyl, neopentyl, n-octyl, n-nonyl, lauryl, n-decyl, t-amyl, 3-ethylpentyl, 2-methylhexyl, and the like. When modified by the term "lower," the chain length of the alkyl group is one to six carbons. The term "cycloalkyl," as used herein, refers to a cycloalkyl group of four to eight carbons, i.e., cyclobutyl, cyclopentyl, cyclohexyl, cycloheptyl and cyclooctyl. The term "aralkyl," as used herein, refers to an aralkyl group of seven to 12 carbons, such as benzyl, phenylethyl, methylbenzyl and naphthylmethyl.

The present invention also provides a novel method for the control of insects which comprises treating the insects with an effective amount of a compound of formula A. To aid in achieving uniform and economical application, it is advantageous to employ a composition comprising an inert carrier and a compound of formula A. These compositions can be either liquid or solid. The exact formulation employed will vary according to factors, such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary role or mechanism of treating the insects - that is, topical application (absorption), per oral application (ingestion), chemosterilant (sterility) or vaporization (inhalation). The primary mode of treating insects is, in turn, dependent on whether the insect is a chewing insect, a sucking insect or flying insect; whether the control of the insect is sought at the embryo, larvae, pupae or adult stage; and the locus of the insect.

Formulations can be prepared by incorporating a compound of formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable mineral oils conventionally employed as carriers in formulations for insect control. Other components can be included, such at emulsifying agents, wetting agents and dispersing agents. Generally, the formulation will contain less than 95 percent by weight of the compound and more frequently less than 25 percent. Depending upon the particular insect being treated and the particular stage of the life cycle at the time of treatment, control of insects by treating the insects with a compound of formula A is accomplished by the compound's ability to: inhibit metamorphosis; act as a direct insecticide, particularly at the embryo stage; act as a chemo-sterilant; or break the diapause of the insect.

Treatment of insects by vapor action can be accomplished, for example, by formulating a compound of formula A with a resinous material, such as the vinyl polymers, e.g., polyvinyl chloride. This method is particularly useful for flying insects and treating enclosed areas. Suitable formulating methods and carriers are described in U.S. Pat. No. 3,318,769, for example.

The compounds of formula A can be used as the sole active ingredient or can be used together with conventional insecticides, synergists and/or insect sex attractants. Conventional insecticides, such as pyrethrins, allethrin, 2,2-bis(p-methoxyphenyl)-1,1,1-trichloroethane (methoxychloro) and 2,2-dichlorovinyl dimethylphosphonate can be used in the formulations of the present invention. See U.S. Pat. Nos. 2,755,219 and 2,948,654, which set forth formulations in which compounds of formula A can be utilized as the sole active component or in combination with the active components employed therein.

Although not intending to be limited by a theoretical explanation, it appears that the effectiveness of the compounds of formula A can be traced to their ability to mimic the activity of juvenile hormone substances. Juvenile hormone was identified as methyl 10,11-oxido-7-ethyl-3,11-trimethyltrideca-2,6-dienoate using an extract of Cecropia moths by Roeller et al., Angew. Chem. internat. Edit. 6, 179 (1967) and Chemical & Engineering New, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth," Zoology (Proc. N.A.S.) 60, 853 (1968). In addition to the natural juvenile hormones, some synthetic terpenoids have been reported exhibiting maturation inhibiting, sterility or ovicidal activity. Masner et al., Nature 219, 395 (July 27, 1968); U.S. Pat. Nos. 3,429,970 and 3,453,362; and Bowers, "Juvenile Hormone: Activity of Aromatic Terpenoid Ethers," Science 164, 323 (April 1969).

Typical insects which can be controlled by treatment with a compound of formula A in accordance with the present invention are Graphosoma italicum, Aedes aegypti, Dysdercus cingluatus, Tenebrio molitor, Galleria mellonella, Tribolium confusum, Periplaneta americana, Hypera puctata (clover leaf weevil), Dysdercus suturellus, Aphididae, such as melon aphid and cabbage aphid, Tinea pellionella, Sitophilus granarius, Lygus hesperus and Schistocerca vaga.

The compounds (A) wherein $R^1$ is —SR are also useful curing and vulcanization agents for unsaturated hydrocarbon polymers, such as SBR and rubber.

In the description hereinafter, each of $R^1$, $R^2$, $R^3$, $R^4$, $R^5$, $R^6$ and n are as defined hereinabove.

The compounds of formula A are prepared according to the following outlined procedures wherein W represents the group

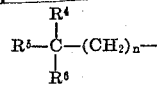

and X is bromo, chloro or iodo.

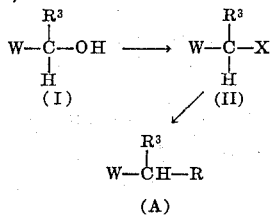

In the practice of the above process, an alcohol of formula I is treated with phosphorus tribromide, phosphorus trichloride, phosphorus pentabromide or pentachloride in organic solvent, such as benzene, ether, tetrhydrofuran, and the like, to yield the halide (II) wherein X is bromo or chloro. The iodine (II) is prepared using triphenylphosphite methiodide according to the method of Landauer and Rydon, Journal of the Chemical Society, 2,224 (1953) which can also be used to prepare the bromides and chlorides. A suitable method for preparation is described also by Corey and Anderson, Journal of Organic Chemistry 32, 4160 (December, 1967).

Compounds of formula A wherein $R^1$ is the group —OR can be prepared by treating the halide (II) with sesamol to yield A wherein R is 3,4-methylenedioxyphenyl and with alkyl 4-hydroxybenzoate, cycloalkyl 4-hydroxybenzoate and aralkyl 4-hydroxybenzoate to yield A wherein R is the group

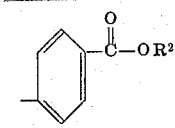

The reaction is carried out in the presence of base. Suitable procedure is described in U.S. Pat. No. 2,764,517.

The compounds of formula A wherein $R^1$ is —SR can be prepared by treating the halide (II) with the required thio alcohol, i.e., the mercaptan of sesamol and the mercaptan of 4-hydroxybenzoate in the presence of sodium hydroxide, sodium alkoxide, and the like. Alternatively, the halide (II) is treated with hydrogen sulfide in alcohol in the presence of base, such as sodium hydroxide, potassium hydroxide, sodium, and the like, to obtain the corresponding mercaptan (II; X is —SH). The thus-obtained mercaptan on treatment with sodium hydroxide, potassium hydroxide, sodium ethoxide, or the like, furnished the corresponding alkali mercaptide which on treatment with the halide (X-R; X is bromo or chloro) furnished the thio ethers of formula A wherein $R^1$ is —SR.

The alcohols of formula I are prepared according to methods described in my application Ser. No. 854,778, filed Sept. 2, 1969 now Pat. No. 3,649,590 and Ser. No. 879,620, filed Nov. 24, 1969 now abandoned, the disclosure of which are incorporated by reference.

The following examples provide detailed procedures for the preparation of the compounds of the present invention and serve to illustrate the synthesis thereof and the practice of the invention. Temperature in degrees Centigrade.

EXAMPLE 1

(A) To a mixture of 9 g. of 7,7-dimethyloctan-2-ol and 30 ml. of ether at 0° is added a solution of 8 ml. of phosphorus tribromide in 25 ml. of ether slowly. The mixture is stirred at 0° for 2 hours and then heated at 30° for 2 hours. The mixture is cooled, washed with water, dried over magnesium sulfate and evaporated to yield 2-bromo-7,7-dimethyloctane.

By repeating the above procedure using each of 4,4,8,8-tetramethylnonan-2-ol, 5,5-dimethylhexan-2-ol, 6,6-dimethylheptan-2-ol, 5,5-dimethylheptan-2-ol, 6,6-dimethyloctan-3-ol, 6,6-dimethyloctan-2-ol and 5-ethyl-5-methylheptan-2-ol as the starting material, there is obtained the respective bromides listed in Column I.

COLUMN I 2-bromo-4,4,8,8-tetramethylnonane,
2-bromo-5,5-dimethylhexane,
2-bromo-6,6-dimethylheptane,
2-bromo-5,5-dimethylheptane,
3-bromo-6,6-dimethyloctane,
2-bromo-6,6-dimethyloctane and
2-bromo-5-ethyl-5-methylheptane.

(B) To a solution of 0.5 g. of sodium and 10 ml. of methanol at room temperature is added 3 g. of ethyl p-hydroxy-benzoate and then 3.5 g. of 2-bromo-7,7-dimethyloctane. The mixture is then refluxed for 7.5 hours. After cooling, the reaction mixture is filtered. The filtrate is diluted with water and then extracted with ether. The ethereal extracts are combined, washed, dried over sodium sulfate and evaporated under reduced pressure to yield ethyl 4-(1',6',6'-trimethylheptyloxy)benzoate which is purified by chromatography.

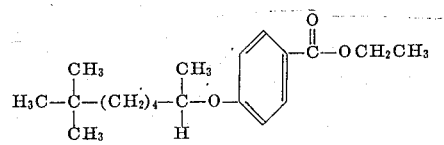

The above process is repeated using each of the bromides listed in Colum I to yield:
ethyl 4-(1',3',3',7',7'-pentamethyloctyloxy)benzoate,
ethyl 4-(1',4',4'-trimethylpentyloxy)benzoate,
ethyl 4-(1',5',5'-trimethylhexyloxy)benzoate,
ethyl 4-(1',4',4'-trimethylhexyloxy)benzoate,
ethyl 4-(1'-ethyl-5',5'-dimethylheptyloxy)benzoate, ethyl 4-(1',5',5'-trimethylheptyloxy)benzoate and
ethyl 4-(4'-ethyl-1',4'-dimethylhexyloxy)benzoate,
respectively.

By repeating the process of this example using methyl p-hydroxybenzoate, the corresponding methyl 4-substituted benzoates are obtained.

EXAMPLE 2

A mixture of 0.8 g. of potassium carbonate, 0.8 g. of sesamol and 1.2 g. of 2-bromo-7,7-dimethyloctane in 30 ml. of acetone, under nitrogen, is stirred for three hours and then refluxed for 3 hours. After cooling, the reaction mixture is poured into water and then extracted with ether. The ethereal extracts are combined, washed with cold 2N sodium hydroxide, water and then saturated sodium chloride, dried over magnesium sulfate and evaporated under reduced pressure to yield 2-(3',4'-methylenedioxyphenoxy)-7,7-dimethyloctane which is purified by chromatography.

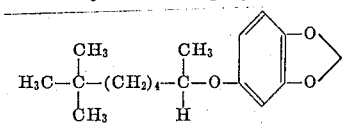

The process of this example is repeated using each of the bromides listed in Column I to yield each of:
2-(3',4'-methylenedioxyphenoxy)-4,4,8,8-tetramethylnonane,
2-(3',4'-methylenedioxyphenoxy)-5,5-dimethylhexane,
2-(3',4'-methylenedioxyphenoxy)-6,6-dimethylheptane,
2-(3',4'-methylenedioxyphenoxy)-5,5-dimethylheptane,
3-(3',4'-methylenedioxyphenoxy)-6,6-dimethyloctane,
2-(3',4'-methylenedioxyphenoxy)-6,6-dimethyloctane and
2-(3',4'-methylenedioxyphenoxy)-5-ethyl-5-methylheptane.

EXAMPLE 3

To a mixture of 1 g. of sodium and 30 ml. of methanol at room temperature is added 5 g. of methyl p-hydroxyphenyl ketone and then 6.5 g. of 2-bromo-7,7-dimethyloctane. The mixture is then refluxed for 8 hours. After cooling, the mixture is diluted with water and then extracted with ether. The ethereal extracts are combined, washed, dried over magnesium sulfate and evaporated under reduced pressure to yield methyl 4-(1',6',6'-trimethylheptyloxy)phenyl ketone which is purified by chromatography.

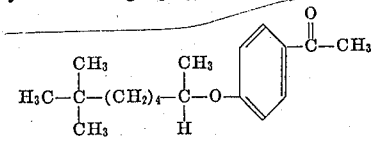

By repeating the process of this example using each of the bromides listed in Column I, there is obtained each of:
methyl 4-(1',3',3',7',7'-pentamethyloctyloxy)phenyl ketone,
methyl 4-(1',4',4'-trimethylpentyloxy)phenyl ketone,
methyl 4-(1',5',5'-trimethylhexyloxy)phenyl ketone,
methyl 4-(1',4',4'-trimethylhexyloxy)phenyl ketone,
methyl 4-(1'-ethyl-5',5'-dimethylheptyloxy)phenyl ketone,
methyl 4-(1',5',5'-trimethylheptyloxy)phenyl ketone and
methyl 4-(4'-ethyl-1',4'-dimethylhexyloxy)phenyl ketone.

By using ethyl p-hydroxyphenyl ketone is the foregoing process, the corresponding ethyl 4-substituted phenyl ketones are obtained.

EXAMPLE 4

To a solution of 2 g. of sodium hydroxide in 40 ml. of methanol, saturated with hydrogen sulfide, is added 5.5 g. of 2-bromo-7,7-dimethyloctane. The mixture is stirred at about 25° for about 6 hours with continued introduction of hydrogen sulfide. The mixture is then diluted with water and extracted with petroleum ether. The organic phase is separated, washed well with water, dried over sodium sulfate and evaporated under reduced pressure to yield 7,7-dimethyloctan-2-thiol.

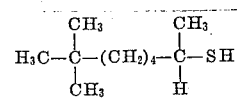

EXAMPLE 5

The chlorides in Column II are prepared using phosphorus trichloride following the procedure of Example 1 (A).

COLUMN II 2-chloro-7,7-dimethyloctane,
2-chloro-4,4,8,8-tetramethylnonane,
2-chloro-5,5-dimethylhexane,
2-chloro-6,6-dimethylheptane,
2-chloro-5,5-dimethylheptane,
3-chloro-6,6-dimethyloctane,
2-chloro-6,6-dimethyloctane and
2-chloro-5-ethyl-5-methylheptane.

EXAMPLE 6

To triphenylphosphite methiodide (21 g.) is cautiously added one molar equivalent of 7,7-dimethyloctan-2-ol. After addition is complete, the mixture is shaken a few minutes, ether (50 ml.) is added and then heated at about 60° for 2 hours. After cooling, the reaction mixture is taken up in ether, washed with diluted sodium hydroxide solution and water, dried and solvent removed by evaporation to yield 2-iodo-7,7-dimethyloctane which is purified by distillation.

The above process is repeated using each of the other alcohols listed in Example 1 (A) to yield:
2-iodo-4,4,8,8-tetramethylnonane,
2-iodo-5,5-dimethylhexane,
2-iodo-6,6-dimethylheptane,
2-iodo-5,5-dimethylheptane,
3-iodo-6,6-dimethyloctane,
2-iodo-6,6-dimethyloctane and
2-iodo-5-ethyl-5-methylheptane.

EXAMPLE 7

To a solution of 1.0 g. of sodium and 25 ml. of ethanol is added 7 g. of 7,7-dimethyloctan-2-thiol and then 6 g. of methyl p-bromobenzoate, under nitrogen. The reaction mixture is stirred for 1 hour and then refluxed for 4 hours. After cooling, the mixture is diluted with water and then extracted with ether. The ethereal extracts are combined, washed, dried over sodium sulfate and evaporated under reduced pressure to yield methyl 4-(1',6',6'-trimethylheptylthio)-benzoate.

Methyl 4-(1',6',6'-trimethylheptylthio)phenyl ketone and 2-(3',4'-methylenedioxyphenylthio)-7,7-dimethyloctane using methyl p-bromophenyl ketone and 1-bromo-3,4-methylenedioxybenzene in the above process.

Alternatively, the sulfides are prepared from the mercaptan (RSH), e.g., 3,4-methylenedioxyphenyl-mercaptan, by reaction with the quaternary alkyl bromides (II; X is bromo), for example, those of Example 1 (A), in methanol and sodium and refluxing for about 3 hours.

EXAMPLE 8

(A) To 0.6 g. of magnesium in 4 ml. of ether, under nitrogen, is added 3.8 g. of neopentyl bromide in 18 ml. of ether over one hour. The mixture is then refluxed for one hour and allowed to cool. The thus-prepared Grignard is added to a suspension of pyrrolidine (4.3 ml.) and cuprous iodide (5 g.) in ether (80 ml.) at −80° and stirred for 1.5 hours. Then 2.4 g. of methyl 2-butynoate is added and after 0.5 hours at −80°, methanol is added and the mixture poured into saturated ammonium chloride and extracted with ether. The ethereal extracts are combined, washed with saturated ammonium chloride and saturated sodium chloride, dried over magnesium sulfate and solvent evaporated to yield methyl 3,5,5-trimethylhex-2-enoate which is purified by chromatography.

The above process can be outlined as follows (X' is bromo or chloro and R' is lower alkyl):

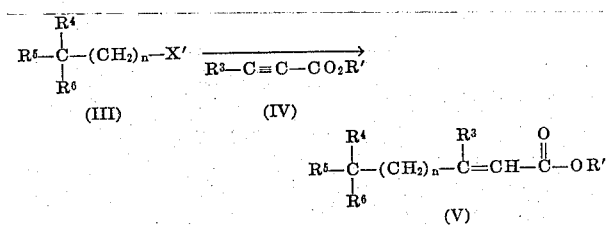

The bromides and chlorides of formula III are described in my application Ser. No. 854,778, filed Sept. 2, 1969 now U.S. Pat. No. 3,649,590. Using the above procedure, other alkyl esters of formula V are prepared from the quaternary alkyl halides (III) and alkyl acetylenic ester (IV). Thus, 1-bromo-4,4-dimethylpentane is converted into the copper complex and reacted with each of methyl 2-butynoate and methyl 2-pentynoate to yield methyl 3,7,7-trimethyloct-2-enoate and methyl 3-ethyl-7,7-trimethyloct-2-enoate, respectively.

(B) To a stirred solution of 1.0 g. of methyl 3,5,5-trimethylhex-2-enoate in 20 ml. of dry ether is added with stirring to 0.4 g. of lithium aluminum hydride covered in ether at 0°. After about one hour, 2.5 ml. of acetic acid is added. The mixture is washed with ice water and the ether phase dried and evaporated to yield 3,5,5-trimethylhex-2-en-1-ol.

By use of the above process, each of the esters of formula V are reduced to the corresponding allylic alcohol.

(C) A stream of ozonized oxygen is passed into a cooled (0°) solution of 3,5,5-trimethylhex-2-en-1-ol (2.5 g.) in 50 ml. of acetic acid and 10 ml. of methyl acetate until absorption of ozone ceases. The methyl acetate is evaporated under reduced pressure and hydrogen peroxide (15 ml.) is added and the mixture kept at about 35° for about 48 hours and then poured into water. Work-up with ether affords 4,4-dimethylpentan-2-one which can be purified by chromatography or via formation of the semicarbazone, crystallization and hydrolysis with acid.

(D) Six grams of 4,4-dimethylpentan-2-one is added to a solution of 3.0 g. of sodium borohydride, 80 ml. of methanol and 6 ml. of 2N sodium hydroxide solution. After about 2 hours, acetic acid is added to destroy excess sodium borohydride and the solution poured into water and extracted with ether. The combined ether extracts are washed with aqueous sodium bicarbonate, water and brine, dried and evaporated to yield 4,4-dimethylpentan-2-ol which is purified by chromatography.

By use of the procedures of Parts A-D, the secondary alcohols of formula I are prepared.

EXAMPLE 9

Triphenyl phosphite benzylochloride (10 g.) is mixed with 1.9 g. of 7,7-dimethyloctan-2-ol and kept at room temperature overnight. The crude 2-chloro-7,7-dimethyloctane is washed with 2N sodium hydroxide and water and dried to yield 2-chloro-7,7-dimethyloctane which is further purified by distillation.

Similarly, other alcohols of formula I are converted into the corresponding chloride.

EXAMPLE 10

Compositions useful for the control of insects in accordance with the present invention are exemplified by the following which are applied by spraying to provide about 0.5 to 6 pounds per acre surface area of the active compound or compounds. For the control of Aedes aegypti, the compositions are applied during larvae stage to provide from about 1 to 8 pounds of active component per acre. Parts by weight.

| | Parts |
|---|---|
| (A) | |
| 2-(3',4'-methylenedioxyphenoxy)-6,6-dimethylheptane | 30 |
| Kerosene | 70 |
| (B) | |
| 2-(3',4'-methylenedioxyphenoxy)-6,6-dimethyloctane | 1 |
| ethyl trans,trans,trans 10,11-oxido-3,7,11-trimethyltrideca-2,6-dienoate | 0.5 |
| Xylene | 98.5 |
| (C) | |
| methyl 4-(1',5',5'-trimethylhexyloxy)-benzoate | 10 |
| Kerosene | 90 |

Composition B provides excellent control for immature Aphids. The composition has a greater activity than either of the active compounds singly.

What is claimed is:

1. A compound of the formula:

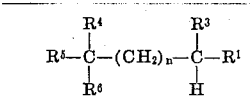

wherein, n is an integer of one to six;

R¹ is the group —OR or —SR in which R is 3,4-methylene-dioxyphenyl; and each of $R^3$, $R^4$, $R^5$ and $R^6$ is lower alkyl.

2. A compound according to claim 1 wherein each of $R^3$, $R^4$, $R^5$ and $R^6$ is methyl or ethyl.

3. A compound according to claim 2 wherein n is two to four.

4. A compound according to claim 3 wherein each of $R^3$, $R^4$ and $R^6$ is methyl and $R^5$ is methyl or ethyl.

5. A compound according to claim 4 wherein n is three.

6. A compound according to claim 5 wherein R¹ is the group —OR in which R is 3,4-methylenedioxyphenyl.

7. A compound according to claim 3 wherein $R^3$ is methyl.

8. A compound according to claim 1 wherein each of $R^3$, $R^4$, $R^5$ and $R^6$ is methyl; n is 4; R¹ is —OR; and R is 3,4-methylenedioxyphenyl.

* * * * *

PO-1050
(5/69)

UNITED STATES PATENT OFFICE
CERTIFICATE OF CORRECTION

Patent No. 3,711,517   Dated January 16, 1973

Inventor(s) John B. Siddall

It is certified that error appears in the above-identified patent and that said Letters Patent are hereby corrected as shown below:

The title "Quaternary Alkyl Ethers of Mechlenedis-Xyphenyl Compounds"

should read

--Quaternary Alkyl Ethers of Methylenedioxyphenyl Compounds--

Signed and sealed this 15th day of October 1974.

(SEAL)
Attest:

McCOY M. GIBSON JR.
Attesting Officer

C. MARSHALL DANN
Commissioner of Patents